United States Patent
Farooq et al.

(10) Patent No.: US 9,915,089 B2
(45) Date of Patent: Mar. 13, 2018

(54) METHOD OF CONTROLLING A SUNROOF OF A PARKED VEHICLE

(71) Applicant: FORD GLOBAL TECHNOLOGIES, LLC, Dearborn, MI (US)

(72) Inventors: Iskander Farooq, Novi, MI (US); Mohammed Omar Faruque, Ann Arbor, MI (US); Dean M Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 14/923,119

(22) Filed: Oct. 26, 2015

(65) Prior Publication Data
US 2017/0114584 A1    Apr. 27, 2017

(51) Int. Cl.
*E05F 15/00*    (2015.01)
*E05F 15/70*    (2015.01)
(Continued)

(52) U.S. Cl.
CPC .............. *E05F 15/70* (2015.01); *B60J 7/043* (2013.01); *E05F 15/60* (2015.01); *E05F 15/71* (2015.01);
(Continued)

(58) Field of Classification Search
CPC .......... E05F 15/71–15/79; E05F 15/60; E05F 15/695; E05F 15/40; E05F 15/41;
(Continued)

(56) References Cited

U.S. PATENT DOCUMENTS 4,240,516 A * 12/1980 Henderson .............. B60R 25/00
                                                          180/289
4,942,349 A *  7/1990 Millerd ................... B60S 1/485
                                                          15/250.13
(Continued)

FOREIGN PATENT DOCUMENTS

| CN | 2748598 Y | 12/2005 |
| CN | 103192685 A | 7/2013 |
| CN | 203114010 U | 8/2013 |

OTHER PUBLICATIONS

English Machine Translation of CN 203114010.
(Continued)

*Primary Examiner* — Justin B Rephann
(74) *Attorney, Agent, or Firm* — Jason Rogers; King & Schickli, PLLC

(57) ABSTRACT

A method of controlling a sunroof of a parked vehicle is provided. The method includes the steps of: monitoring a state of an engine; monitoring a state of the sunroof; monitoring a state of at least one accessory; initiating a timer when the state of the engine changes to an off state, the state of the sunroof is an open state, and the state of the at least one accessory is an off state; and closing the sunroof a period of time after initiation of the timer. The method may further include sensing for precipitation throughout the period of time, and closing the sunroof upon sensing precipitation regardless of whether the period of time has elapsed. The method may further include sensing for an occupant within the vehicle when the period of time has elapsed or when precipitation is sensed, and foregoing the step of closing the sunroof if an occupant is sensed.

19 Claims, 3 Drawing Sheets

(51) Int. Cl.
*B60J 7/043* (2006.01)
*E05F 15/60* (2015.01)
*E05F 15/71* (2015.01)
*E05F 15/73* (2015.01)
*E05F 15/79* (2015.01)

(52) U.S. Cl.
CPC .............. *E05F 15/73* (2015.01); *E05F 15/79* (2015.01); *E05Y 2900/542* (2013.01)

(58) Field of Classification Search
CPC ..... E05F 15/46; B60J 7/043; E05Y 2900/542; H02H 3/006
See application file for complete search history.

(56) References Cited

U.S. PATENT DOCUMENTS

| | | | | |
|---|---|---|---|---|
| 5,054,686 | A * | 10/1991 | Chuang | B60H 1/00735 236/1 R |
| 5,057,754 | A * | 10/1991 | Bell | B60R 16/0231 15/250.001 |
| 5,194,756 | A | 3/1993 | Darbesio | |
| 5,321,345 | A * | 6/1994 | Lambros | B60J 7/0573 307/10.1 |
| 5,334,876 | A * | 8/1994 | Washeleski | B60J 7/0573 307/10.1 |
| 5,459,380 | A | 10/1995 | Augustinowicz | |
| 5,952,801 | A * | 9/1999 | Boisvert | H02H 7/0851 318/468 |
| 5,955,854 | A * | 9/1999 | Zhang | B60J 7/0573 318/264 |
| 6,064,165 | A * | 5/2000 | Boisvert | B60J 7/0573 318/465 |
| 6,138,068 | A | 10/2000 | Liu | |
| 6,404,158 | B1 * | 6/2002 | Boisvert | B60J 7/0573 318/466 |
| 7,342,373 | B2 * | 3/2008 | Newman | B60H 1/00735 318/280 |
| 8,849,505 | B2 * | 9/2014 | Menard | B60J 7/0573 307/9.1 |
| 9,290,146 | B2 * | 3/2016 | Breed | B60R 21/01536 |

OTHER PUBLICATIONS

English Machine Translation of CN 2748598.
English Machine Translation of CN 103192685.
Webasto—Feel the drive Operating Instructions Sunroof: Hollandia 300, 500, 600, 700, 710 Doc.-No. 0912033A Date: Apr. 20, 2004.
Signature Automotive Products Signature Series Inbuilt Installation Guide Offered by Signature Automotive Products.

* cited by examiner

METHOD OF CONTROLLING A SUNROOF OF A PARKED VEHICLE

TECHNICAL FIELD

This document relates generally to vehicle sunroofs, and more specifically to a method of controlling a sunroof when the vehicle is parked.

BACKGROUND

It is known that vehicle occupants often forget or overlook the importance of closing the sunroof of their vehicle before exiting the vehicle at the end of a trip. Unfortunately, leaving the sunroof open can result in deleterious consequences. For instance, valuables, or even the vehicle itself, may be lost to thieves, rain, snow, or other undesirable elements may enter through the open sunroof resulting in frustration on the part of the vehicle owner and damage to the vehicle interior, carpeting, and/or electronics. Accordingly, a need exists to prevent such events from occurring due to the forgetfulness of the vehicle owner or otherwise.

U.S. Published Patent Application No. 2008/0106116 describes a system designed, for example, to automatically close the sunroof under certain conditions. These conditions include closing the sunroof after a predetermined period of time has elapsed since the engine was turned off or when rain is sensed. Even more, the reference suggests that these conditions may be combined with a motion sensor to ensure that the vehicle is empty. While these and similar systems are effective in some circumstances, there are other circumstances when a vehicle occupant may be in the vehicle (e.g., while waiting to pick up a child from an activity) with the engine off and the sunroof open when it is not desirable for the vehicle to automatically close the sunroof. In such an instance, the occupant could be asleep, and thus not moving, or simply sitting still while accessing their smartphone or listening to music or news, and enjoying the air while waiting. Alternatively, the vehicle occupant could be a sleeping pet or a young child incapable of reversing the closing of the sunroof. In these circumstances, simply relying on a lack of motion or the presence of rain can result in less than desirable circumstances.

In order to avoid such scenarios, a need is clearly identified for a more robust system. Such a system would close the sunroof only if conditions warranted such action. Ideally, the system would ensure the lack of occupants in the vehicle by further monitoring commonly used auxiliary devices to ensure that an occupant is not just idly sitting or sleeping in the vehicle. Accessory devices generally include non-engine, battery powered accessories in the car such as radio, CD players, navigational displays, power doors, windows, sunroof, etc. This would prevent inadvertent closures of the sunroof which can frustrate vehicle owners and possibly endanger occupants in certain circumstances. In addition, more robust means of determining whether an occupant is in the vehicle other than motion sensors may be utilized. For example, load cells may be positioned within one or more seats or infrared or thermal sensors may be utilized.

SUMMARY OF THE INVENTION

In accordance with the purposes and benefits described herein, a method is provided of controlling a sunroof of a parked vehicle. The method may be broadly described as comprising the steps of: monitoring a state of an engine; monitoring a state of the sunroof; monitoring a state of at least one accessory; initiating a timer when the state of the engine changes from an on state to an off state, the state of the sunroof is an open state, and the state of the at least one accessory is an off state; and closing the sunroof a period of time after initiation of the timer.

In one possible embodiment, the method further includes the steps of sensing for precipitation throughout the period of time, and closing the sunroof upon sensing precipitation regardless of whether the period of time has elapsed.

In another possible embodiment, the method further includes the steps of sensing for an occupant within a passenger compartment of the vehicle when the period of time has elapsed, and foregoing the step of closing the sunroof if an occupant is sensed within the passenger compartment.

In another possible embodiment, the method further includes the steps of sensing for an occupant within a passenger compartment of the vehicle when precipitation is sensed, and foregoing the step of closing the sunroof if an occupant is sensed within the passenger compartment.

In yet another possible embodiment, the method further includes the steps of monitoring a state of the door locks and initiating the timer only if the state of the door locks is locked. In another possible embodiment, the period of time is equal to or greater than ten minutes.

In accordance with a second aspect of the invention, a method is provided of controlling a sunroof of a parked vehicle, comprising the steps of determining a state of an accessory after a state of an engine changes from an on state to an off state, initiating a timer when the state of the engine changes from the on state to the off state if the accessory is in an off state, and closing the sunroof after a period of time has elapsed if the engine and the accessory remain in off states.

In another possible embodiment, the method further includes the steps of sensing for motion within a passenger compartment of the vehicle, and foregoing the step of closing the sunroof if motion is sensed within the passenger compartment.

In still another possible embodiment, the method further includes the steps of sensing for precipitation throughout the period of time, and closing the sunroof upon sensing precipitation regardless of whether the period of time has elapsed.

In yet another possible embodiment, the method further includes the steps of monitoring a state of the door locks and initiating the timer only if the state of the door locks is locked.

In another possible embodiment, a circuit for controlling a sunroof of a parked vehicle may be broadly described as comprising a first control module for monitoring a state of an engine of the vehicle, a second control module for monitoring a state of at least one accessory, a third control module, responsive to the first and second control modules via a communication network, for closing the sunroof a period of time after the state of the engine changes from an on state to an off state if the state of the at least one accessory is off.

In still another possible embodiment, the circuit for controlling a sunroof of a parked vehicle further includes a sensor for sensing for an occupant within a passenger compartment of the vehicle when the period of time has elapsed, and wherein the third control module, responsive to the first and second control modules and the occupant sensor via the communication network, closes the sunroof after the period of time after the state of the engine changes from the on state to the off state if no occupant is sensed within the passenger compartment.

In one other possible embodiment, the circuit for controlling a sunroof of a parked vehicle further includes a precipitation sensor, wherein the third control module, responsive to the precipitation sensor via the communication network, closes the sunroof after the state of the engine changes from the on state to the off state if the precipitation sensor senses precipitation regardless of whether the period of time has elapsed.

In other possible embodiments, the circuits for controlling a sunroof of a parked vehicle described above are incorporated into a vehicle.

In the following description, there are shown and described several embodiments of a method of controlling a sunroof of a parked vehicle and related circuits. As it should be realized, the methods and circuits are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle, circuits, and method and together with the description serve to explain certain principles thereof. In the drawing figures.

Reference will now be made in detail to the present preferred embodiments of the method of controlling a sunroof of a parked vehicle and related circuits, examples of which are illustrated in the accompanying drawing figures, wherein like numerals are used to represent like elements.

DETAILED DESCRIPTION

Figure 1:
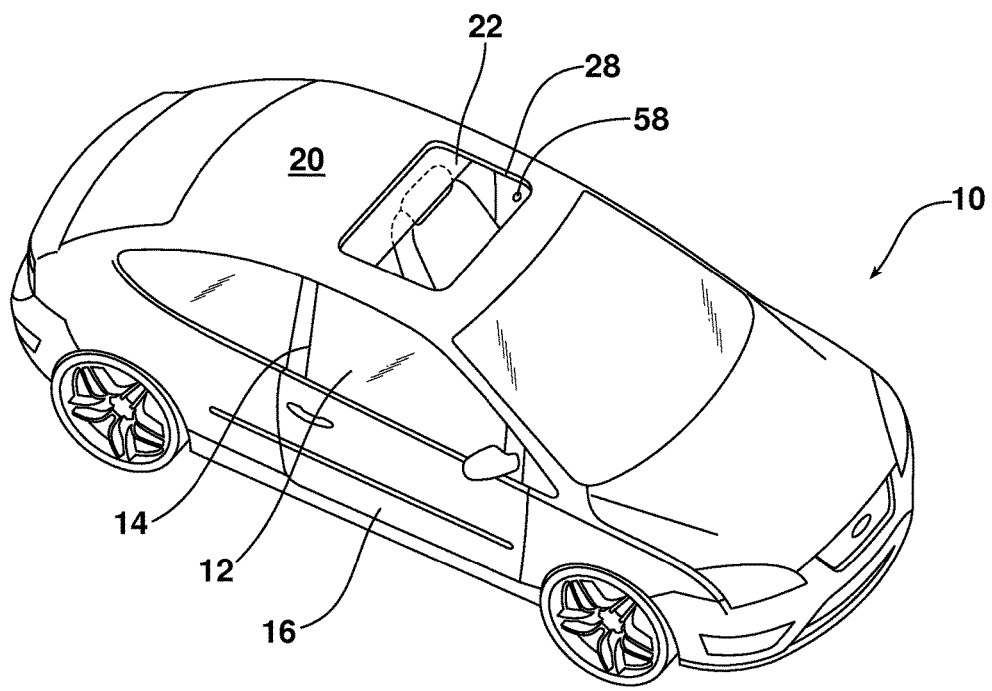
FIG. 1 is an exemplary illustration of a vehicle in perspective view.

Reference is now made to FIG. 1, an automotive passenger vehicle 10 is generally illustrated equipped with various movable closure members. The vehicle 10 is generally shown as a passenger vehicle having a body that includes powered window assemblies. The powered window assemblies include, for example, a window 12 that moves between open and closed positions within an opening 14 in the side door 16 of the vehicle 10.

Additionally, the vehicle 10 has a powered sunroof assembly located in the roof 20 of the vehicle body. The sunroof assembly includes a movable member 22 (shown partially open), such as a transparent glass window, which is commonly referred to as a moon roof. A sunroof is a retractable roof panel often made of the same material as the body of the vehicle that lets light or air into a vehicle. Sunroofs that are glass, or are otherwise see through or translucent, are typically referred to as moon roofs. For purposes of this invention, moon roofs are considered to be a subset of sunroofs.

As should be evident to those skilled in the art, the sunroof 22 may be actuated responsive to a user switch 24 and may include an actuator 26, such as a motor, to move the sunroof 22 between the open position and the closed position. The sunroof 22 is actuated by a motor 26 to move fore and aft between a closed position and an open position with respect to an opening 28 in the roof 20.

Figure 2:
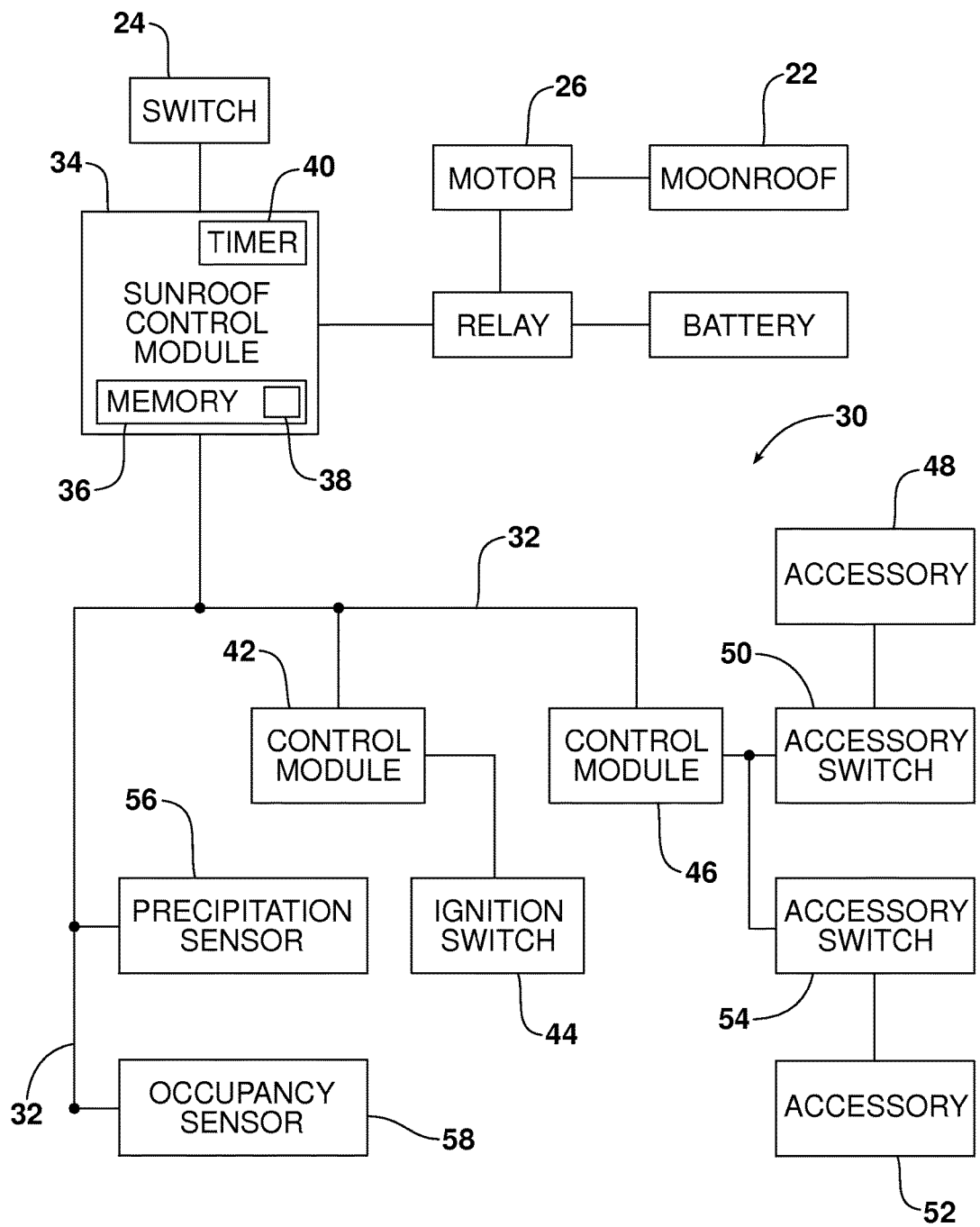
FIG. 2 is a is a block diagram of an exemplary circuit for controlling a sunroof of a parked vehicle.

FIG. 2 illustrates a schematic diagram of an exemplary circuit 30 for controlling a sunroof of a parked vehicle. The circuit 30 includes a plurality of control modules interconnected by a communications network 32. The communications network 32 may be a controller area network (CAN) bus or a local interconnect network (LIN) bus, as is known in the art. As shown, a first control module 34 includes a memory 36 that stores a sunroof control program 38 run by the control module, and an internal timer 40. The timer 40 is utilized to determine elapsed times, among other tasks, as will be described in more detail below. Such elapsed times and/or predetermined periods of time described herein are configurable and may be changed during the manufacturing process, or in possible alternate embodiments by the vehicle owner. In the described embodiment, the first control module 34 is a sunroof control module which monitors an "OPEN" or a "CLOSED" state of the sunroof 22.

In the described circuit 30, the sunroof control module 34 continuously monitors and receives inputs concerning various conditions associated with the vehicle 10. The inputs may be received directly from a sensor (e.g., a precipitation sensor, a thermal sensor, a load sensor or the like), or from other control modules within the vehicle via the communications network 32. Dependent upon those inputs, the sunroof control module 34 may initiate certain actions including, for example, closing the sunroof 22 under certain circumstances.

The circuit 30 further includes a second control module 42 for monitoring a state of an engine (not shown) of the vehicle 10. More specifically, the second control module 42 monitors the status of an ignition switch 44 in order to determine whether the engine is in an "ON" or an "OFF" state. The state of the engine is communicated via the communications network 32 to the first control module 34 and utilized in determining whether to close the sunroof 22.

In addition, the circuit 30 includes a third control module 46 for monitoring a state of at least one accessory of the vehicle 10. The control module 46 monitors the state of at least one accessory primarily in order to ensure that the vehicle 10 is unoccupied before automatically closing the sunroof 22 after the engine is turned to an "OFF" state. As indicated above, accessories or accessory devices generally include non-engine, vehicle battery powered accessories in the vehicle such as a radio, a CD player, navigational displays, power doors, power windows, a power sunroof, etc. In the described embodiment, an "ON" or "OFF" state of the at least one accessory of the vehicle is monitored by the third control module 46.

Generally speaking, each accessory is associated with a control module which is connected to a communications network of a vehicle. The control module may be a body control module, a power train control module, or each accessory may have its own designated control module. Regardless, the associated control module is connected to the communications network and provides information concerning the "ON" or "OFF" state of the accessory via the network to the control module responsible for closing the sunroof which, in the described embodiment, is the sunroof control module.

In the described embodiment, the accessory 48 monitored by the control module 46 is a radio. In this scenario, the "ON" or "OFF" status of the radio 48, which is determined by monitoring the radio switch 50, is communicated to the sunroof control module 34. If the engine has been in the "OFF" state for the predetermined period of time ($t_P$), and the radio 48 is in an "OFF" state, then the sunroof control module 34 will close the sunroof 22. If the state of the radio 48 is "ON," however, the sunroof control module 34 will forego closing the sunroof 22. In the described embodiment, the predetermined period of time ($t_P$) is greater than or equal to ten minutes. Of course, different periods of time may be utilized in accordance with the invention.

A second accessory 52 the control module 46 monitors is the door locks. In this instance, the "LOCKED" or "UNLOCKED" state of the door locks 52 is determined by monitoring the door locks switch(s) 54. The "LOCKED" or "UNLOCKED" state of the door locks 52 is communicated to the sunroof control module 34 via the communications network 32. In the described embodiment, the sunroof control module 34 will not initiate the timer 40 after the state of the engine changes from the "ON" state to the "OFF" state unless the door locks 52 are in a "LOCKED" state. If the door locks 52 are in the "LOCKED" state, then the timer 40 is initiated and the sunroof control module 34 will operate to close the sunroof 22 at the end of the predetermined period of time ($t_P$) under certain circumstances. If the state of the door locks 52 is "UNLOCKED," however, the sunroof control module 34 will forego closing the sunroof 22.

In alternate embodiments, additional accessories may be monitored by a control module to determine a state of the additional accessories. The state of the accessories may be communicated to the sunroof control module 34 via the communications network 32. Depending on the accessory and the state thereof, certain actions may be taken by the sunroof control module 34. For example, the sunroof control module 34 may not initiate the timer 40 after the state of the engine changes from the "ON" state to the "OFF" state unless the accessory is in a certain state (e.g., an "ON" or a "CLOSED" state). Similarly, the sunroof control module 34 may operate to forego closing the sunroof 22 at the end of the predetermined period of time ($t_P$), or to close the sunroof at the end of the predetermined period of time ($t_P$).

In addition to the at least one accessory, additional information is likewise received by the sunroof control module 34 from sensors/control modules within the vehicle 10 either directly or via the communications network 32. In the described embodiment, the sunroof control module 34 receives information from two types of sensors. In the described embodiment, the circuit 30 includes precipitation and occupancy sensors. Such sensors typically include a processing unit whether on a separate printed circuit board or together with the sensor, and are linked to the communications network 32. The sensors/processing units may be directly connected to the communications network 32 or through a control module (e.g., a restraint control module).

In the described embodiment, a precipitation sensor 56 is positioned on the vehicle 10 for sensing the presence of precipitation (e.g., snow or rain). If the precipitation sensor 56 determines the presence of precipitation, then the sensor provides an output via the communications network 32 to the sunroof control module 34. In the instance where precipitation is determined to be present, the sunroof control module 34 will operate to close the sunroof 22 if the engine is in an "OFF" state and the state of the at least one accessory indicates that the vehicle 10 is unoccupied. This is the case regardless of whether the predetermined period of time ($t_P$) has elapsed or not.

Similarly, an occupancy sensor 58 is positioned within the passenger compartment of the vehicle 10 and generates an output indicating the presence of an occupant within one or more seats of the vehicle. If the occupancy sensor 58 determines the presence of an occupant, then the sensor provides an output via the communications network 32 to the sunroof control module 34. In the instance where an occupant is determined to be present, the sunroof control module 34 will forego closing the sunroof 22. This is the case even if the engine is in an "OFF" state, the state of the at least one accessory indicates that the vehicle 10 is unoccupied, and the predetermined period of time ($t_P$) has elapsed. This feature ensures that the sunroof 22 remains open in circumstances when it is not desirable for the vehicle 10 to automatically close the sunroof.

In the described embodiment, the occupancy sensor 58 (shown in FIG. 1) is a motion sensor sensing movement within the passenger compartment. Alternate embodiments, however, may include an infrared sensor, a thermal sensor, or even load cells/sensors positioned within one or more of the vehicle seats. In alternate embodiments, the occupancy sensor may include a plurality of sensors associated with each seat of the vehicle 10 and/or one or more motion or other sensors positioned within the passenger compartment of the vehicle.

Figure 3:
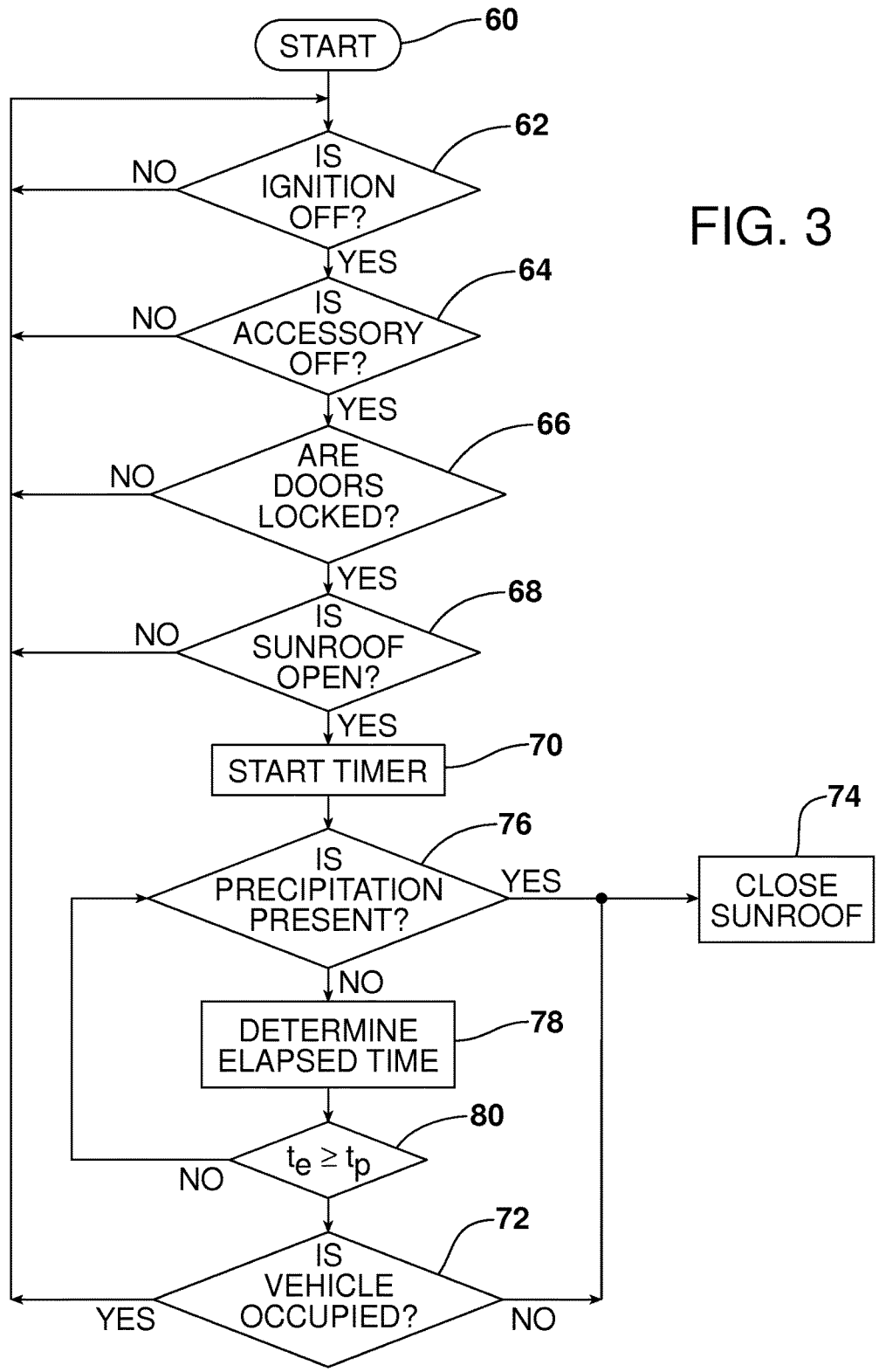
FIG. 3 is a flow chart schematic for controlling a sunroof of a parked vehicle.

The steps utilized in the described embodiment will be described with reference to FIG. 3. FIG. 3 is a flowchart of operational control of the sunroof control system of the parked vehicle 10 according to the described embodiment. The processing sequence related to operational control of the sunroof control system, according to the described embodiment, is executed by a processor of one the sunroof control module 34 communicating via a communications network 32 as the sunroof control program 38 stored in memory 36. Upon initiation of the sequence at Step 60, a state of the engine is monitored at Step 62. If the engine is in an "ON" state, then the sequence returns to Step 60. This loop is repeated until the state of the engine is an "OFF" state as determined at Step 62.

When the state of the engine changes from the "ON" state to the "OFF" state, then a state of at least one accessory 48 is determined at Step 64. If the state of the at least one accessory 48 is "ON," then the sequence returns to Step 62. If there is more than one accessory being monitored, an "ON" state for any one accessory would result in the state of the at least one accessory to be considered "ON" for all accessories. In this instance, the utilization of an accessory indicates an occupant in the vehicle 10 and the sequence will not automatically close the sunroof 22 under such circumstances even if the engine is off.

If the state of the at least one accessory is "OFF" as determined at Step 64, then the state of the door locks 52 is determined at Step 66. If the state of the door locks is "UNLOCKED," then the sequence returns to Step 62. In this instance, the "UNLOCKED" door locks 52 indicate an occupant in the vehicle 10 and the sequence will not automatically close the sunroof 22 under such circumstances even if the engine and the at least one accessory is in an "OFF" state.

If the state of the door locks is "LOCKED" as determined at Step 66, then a state of the sunroof is determined at Step 68. If the state of the sunroof is "CLOSED," then the sequence returns to Step 62. In this instance, the fact that the sunroof 22 is already closed precludes a need to close the sunroof regardless of the other circumstances. If the state of the sunroof is "OPEN" as determined at Step 68, then a timer 40 is initialized setting $t_e=0$ at Step 70. At the end of a predetermined period of time ($t_P$), the occupancy of the vehicle 10 is determined at Step 72 and the sunroof 22 is closed at Step 74 if the vehicle 10 is determined to be unoccupied.

It should be noted that the precipitation sensor 56 begins sensing for precipitation when the state of the engine changes from the "ON" state to the "OFF" state. The sensing is continuous throughout the predetermined period of time ($t_P$). Specifically, the output of the precipitation sensor 56 is checked at Step 76 immediately after the timer 40 is initiated at Step 70. If the precipitation sensor 56 indicates that no precipitation is present, then the sequence continues to Step 78 where the elapsed time ($t_e$) is determined.

If the elapsed time ($t_e$) is less than the predetermined period of time ($t_P$), then the sequence returns to Step 76 and checks the output of the precipitation sensor 56 at Step 76. If at any point throughout the predetermined period of time ($t_P$), the precipitation sensor 56 indicates a presence of precipitation, then the sunroof control module 34 closes the sunroof 22 at Step 74 to prevent possible damage to the vehicle 10 caused by precipitation entering the passenger compartment through the sunroof 22.

If no precipitation is detected and the predetermined period of time ($t_P$) has elapsed, then the control module 34 determines whether a passenger compartment of the vehicle 10 is occupied at Step 72. In the described embodiment, the sensor 58 is an occupancy sensor which may include one or more of a motion sensor, a load cell positioned within a seat of the vehicle 10, and/or an infrared or thermal sensor. Preferably, if a motion sensor is utilized, then at least one additional form of occupancy sensor will be also be used to ensure that a vehicle occupant isn't simply asleep or motionless in the vehicle 10. In alternate embodiments, the status of the seat belt restraints may also be monitored, in combination with an occupancy sensor or otherwise, to ensure the vehicle 10 is unoccupied.

If the occupancy sensor 58 senses an occupant in the passenger compartment of the vehicle 10 at Step 72, then the sequence returns to Step 62 and the sunroof 22 is not closed. In this manner, the aforementioned less than desirable circumstances can be avoided. If the occupancy sensor 58 does not sense an occupant in the passenger compartment of the vehicle 10 at Step 72, then the sunroof control module 34 closes the sunroof 22 at Step 74 to prevent easy access to the passenger compartment by non-vehicle owners and/or the elements.

In summary, numerous benefits result from the method of controlling a sunroof 22 in a parked vehicle 10 as illustrated in this document. The method is capable of controlling the sunroof 22 in the event the vehicle operator forgets to close the sunroof after a trip. In addition, the method takes steps to ensure that circumstances warrant the closing of the sunroof 22 to prevent unintended circumstances.

The foregoing has been presented for purposes of illustration and description. It is not intended to be exhaustive or to limit the embodiments to the precise form disclosed. Obvious modifications and variations are possible in light of the above teachings. For example, operation of the sunroof control system can be made without concern of precipitation or whether the doors are locked. All such modifications and variations are within the scope of the appended claims when interpreted in accordance with the breadth to which they are fairly, legally and equitably entitled.

What is claimed:

1. A method of controlling a sunroof of a parked vehicle, comprising the steps of:
   determining a state of an accessory after a state of an engine changes from an on state to an off state;
   initiating a timer when the state of said engine changes from the on state to the off state if said accessory is in an off state;
   closing the sunroof after a period of time has elapsed if said engine and said accessory remain in off states;
   sensing for precipitation throughout the period; and
   closing the sunroof and sensing for motion within a passenger compartment upon sensing precipitation regardless of whether the period of time has elapsed, and foregoing the step of closing the sunroof if motion is sensed within the passenger compartment.

2. The method of controlling a sunroof of a parked vehicle of claim 1, further comprising the step of monitoring a state of the door locks and initiating the timer only if the state of the door locks is locked.

3. The method of controlling a sunroof of a parked vehicle of claim 1, wherein said accessory is a non-engine, vehicle battery powered accessory.

4. The method of controlling a sunroof of a parked vehicle of claim 1, wherein said accessory is a radio, a CD player, a navigational display, a power door, or a power window.

5. A method of controlling a sunroof of a parked vehicle, comprising the steps of:
   determining a state of an accessory after a state of an engine changes from an on state to an off state;
   initiating a timer when the state of said engine changes from the on state to the off state if said accessory is in an off state;
   sensing for precipitation;
   sensing a presence of an occupant within one or more seats of the vehicle within a passenger compartment;
   closing the sunroof after a period of time has elapsed if said engine and said accessory remain in off states, or closing the sunroof during the period of time upon sensing precipitation, and foregoing the step of closing the sunroof if motion is sensed within the passenger compartment.

6. The method of controlling a sunroof of a parked vehicle of claim 5, further comprising the step of monitoring a state of the door locks and initiating the timer only if the state of the door locks is locked.

7. The method of controlling a sunroof of a parked vehicle of claim 5, wherein said accessory is a non-engine, vehicle battery powered accessory.

8. The method of controlling a sunroof of a parked vehicle of claim 5, wherein said accessory is a radio, a CD player, a navigational display, a power door, or a power window.

9. The method of controlling a sunroof of a parked vehicle of claim 5, wherein the step of sensing a presence of an occupant within one or more seats of the vehicle within the passenger compartment includes the step of sensing for movement of the occupant.

10. The method of controlling a sunroof of a parked vehicle of claim 5, wherein the step of sensing a presence of an occupant within one or more seats of the vehicle within the passenger compartment includes the step of sensing a weight of the occupant.

11. A circuit for controlling a sunroof of a parked vehicle, comprising:
    a first control module for monitoring a state of an engine of the vehicle;

a second control module for monitoring a state of at least one accessory;
a timer, said timer initiating when the state of said engine changes from the on state to the off state if said accessory is in an off state;
a precipitation sensor;
an occupancy sensor;
a third control module, responsive to said first and second control modules via a communication network, said timer, and said precipitation and occupancy sensors, for closing the sunroof and sensing for motion within a passenger compartment upon sensing precipitation regardless of whether the period of time has elapsed, and foregoing closing the sunroof if motion is sensed within the passenger compartment.

12. The circuit for controlling a sunroof of a parked vehicle of claim 11, wherein the third control module communicates with said occupancy sensor via said communication network.

13. The circuit for controlling a sunroof of a parked vehicle of claim 11, wherein the third control module communicates with the precipitation sensor via said communication network.

14. The circuit for controlling a sunroof of a parked vehicle of claim 11, wherein said occupancy sensor is an infrared sensor.

15. The circuit for controlling a sunroof of a parked vehicle of claim 11, wherein said occupancy sensor is a load sensor.

16. The circuit for controlling a sunroof of a parked vehicle of claim 11, wherein said occupancy sensor is a motion sensor.

17. The method of controlling a sunroof of a parked vehicle of claim 11, wherein said at least one accessory is a non-engine, vehicle battery powered accessory.

18. The method of controlling a sunroof of a parked vehicle of claim 11, wherein said at least one accessory includes at least one of a radio, a CD player, a navigational display, a power door, or a power window.

19. A vehicle incorporating the circuit for controlling a sunroof of a parked vehicle of claim 11.

* * * * *